Patented Jan. 29, 1935

1,989,099

UNITED STATES PATENT OFFICE 1,989,099

PROCESS OF IMPROVING ARTIFICIAL THREADS

Leon Lilienfeld, Vienna, Austria

No Drawing. Application May 29, 1929, Serial No. 367,148. In Great Britain June 11, 1928

3 Claims. (Cl. 8—20)

This invention has for an object the treatment of artificial threads of high dry tenacity, exceeding 2 grams, or even 3, 4, or 5 grams per denier or even more, for imparting to such threads a desirable degree of extensibility.

In my Patents Nos. 1,683,199 and 1,683,200, (the former being now issued, Reissue No. 18,170), I have described the manufacture from viscose of artificial threads of high dry tenacity, exceeding 2 grams, or even 3, 4 or 5 grams per denier or more, by a process comprising coagulation of the viscose formed into threads by means of strong mineral acid, particularly strong sulphuric acid of at least 50 to 55 per cent. strength, preferably of at least 60 to 65 per cent. strength.

The present invention constitutes an improvement of the process and product described in said patent in that artificial threads produced according to the said patent acquire an increase in extensibility when treated in accordance with the process of the present invention without experiencing any considerable decrease in strength or lustre.

The present invention also constitutes an improvement on the invention described in my copending application Ser. No. 186,575 filed April 25, 1927, in which has been set forth also several procedures for increasing the extensibility of artificial threads of high dry tenacity, exceeding two grams per denier, produced from viscose in accordance with the disclosure of the above mentioned Patents Nos. 1,683,199 and 1,683,200, one of which procedures of increasing the extensibility consists in treating dry, moist or wet threads with caustic alkali solutions, as sodium hydroxide or potassium hydroxide, of certain specified concentrations under conditions which permit shrinkage of the thread to occur.

In the last mentioned co-pending application the use of aqueous solutions of alkali hydroxide of not less than 15 per cent alkali hydroxide, preferably not less than 18 per cent of alkali hydroxide (calculated as NaOH) has been described as particularly suitable for producing the shrinking effect.

When proceeding in accordance with one illustrative example of the process as described in my said co-pending application Ser. No. 186,575 viscose silk, made according to the process as described in my said Patents Nos. 1,683,199 and 1,683,200 is, for example, introduced, in the finished, dried, but preferably unbleached state, in the form of hanks, without stretching, into an aqueous caustic soda solution of 18–25 per cent. strength at a temperature of 15–18° C. After a period of 1–5 minutes, it is removed and then introduced, if desired, after removal of the excess caustic soda by centrifuging or pressing, and/or, if desired after a short washing, into sulphuric acid of 5–10 per cent. strength at room temperature for about 5 minutes, or into a hot or cold water solution of ammonium sulphate of 5–25 per cent. strength or into hydrochloric acid of 4 per cent. strength. It is then washed, if desired, bleached and dried without stretching or under moderate tension.

My further researches into the action of alkali hydroxide solutions in producing the results in question, and upon which the present disclosure is based, have disclosed the fact that certain solutions of alkali hydroxide containing less than 15 per cent. of alkali hydroxide (calculated at NaOH) give unexpectedly different results from other solutions also containing less than 15 per cent. alkali hydroxide (calculated as NaOH).

When operating upon artificial threads of the character described in my said Patents Nos. 1,683,199 and 1,683,200 with solutions of caustic soda of less than 15 per cent. strength according to the process described above for solutions of caustic soda of at least 15 per cent. strength, unexpected results as shown in the following enumeration appear:—

(a) Caustic soda solution of 1 per cent. strength gives practically no result.

(b) Caustic soda solution of 2 per cent. strength gives a very slight increase of the extensibility.

(c) Caustic soda solution of 3 per cent. strength gives a noticeable increase of extensibility.

(d) Caustic soda solution of 4 per cent. strength gives a good increase of extensibility.

(e) Caustic soda solution of 5 per cent. strength gives an excellent increase of extensibility.

(f) Caustic soda solutions of 6, 7, 8, 10, 12, and 13 per cent. strength give a considerable increase of extensibility, but in some instances cause a tremendous decrease of the dry and wet tenacities and, in addition to this, in many cases spoil the lustre of the artificial silk entirely.

It will be seen from the above that while solutions of caustic soda containing from 2 to 6 per cent. caustic soda give what may be regarded as useful increases in extensibility, those containing from 6 to 13 per cent caustic soda, although favorably affecting the extensibility of the thread are practically less useful owing to the ill effect which they leave on other essential properties of the silk. The use of NaOH solutions of 5 to 10% strength is claimed in a copending application Serial No. 750,017, filed Oct. 25, 1934.

Other alkali metal hydroxides such as potassium hydroxide may be employed in practicing the present process and in this event it should be used in the same molecular proportions as the sodium hydroxide. The appended claims are intended as including the use of sodium hydroxide, potassium hydroxide or any equivalent.

The present invention is applicable not only to the treatment of artificial threads as such (e. g. artificial silk), in the form of spun threads, yarn in hanks or cops or in the form of warp or twisted yarn or the like, but also to artificial threads (e. g. artificial silk or staple fibre) in the form of woven fabrics. It is also applicable to threads or fabrics consisting wholly of artificial fibre (e. g. artificial silk, artificial wool, or staple fibre) and to mixed threads of fabrics, that is fibres or fabrics containing in addition to the artificial threads another fibrous material, for instance natural cotton, silk, wool or the like. The expression "artificial thread" throughout the application is intended to include, wherever the context permits, artificial threads such as artificial silk, artificial cotton, artificial wool, artificial hair and so on, in any of the forms hereinbefore mentioned.

The success of the present process depends upon the fact that the artificial threads, or the materials consisting of or containing them are treated with the caustic alkali solution, by immersion or spraying or in any other suitable manner, while substantially free from tension or under conditions permitting shrinkage to occur. That is to say, either the material under treatment may not be subjected to tension during or after the treatment, or, if tension is applied it must be subsequently discontinued or reduced. The material or thread may be either dry, moist or wet at the commencement of the treatment to be applied.

I claim:—

1. The process for increasing the extensibility of artificial thread of high dry tenacity, exceeding 2 grams per denier, of the kind produced from viscose by coagulation thereof with a strong mineral acid, which comprises treating the said thread with an aqueous caustic alkali solution containing alkali hydroxide between and including the limits of 2 per cent and 5 per cent. (calculated as NaOH) under conditions permitting shrinkage of the thread to occur.

2. The process for increasing the extensibility of artificial thread of high dry tenacity, exceeding 2 grams per denier, of the type obtainable according to United States Patent Nos. 1,683,199 and 1,683,200 which comprises treating the said artificial thread with an aqueous caustic alkali solution containing from about 2 to about 5 per cent. inclusive of alkali hydroxide (calculated as NaOH), under conditions permitting shrinkage to occur.

3. The process for increasing the extensibility of artificial thread of the type obtainable by coagulating viscose with a strong mineral acid, including sulphuric acid, equivalent to at least 50 per cent sulphuric acid which comprises contacting the said artificial thread with an aqueous solution containing from 2 to 5 per cent. inclusive of alkali hydroxide, calculated as NaOH, under conditions permitting shrinkage of the thread to occur.

LEON LILIENFELD.